G. E. ALPHIN.
FERTILIZER DISTRIBUTER.
APPLICATION FILED JUNE 8, 1908.
899,646.
Patented Sept. 29, 1908.
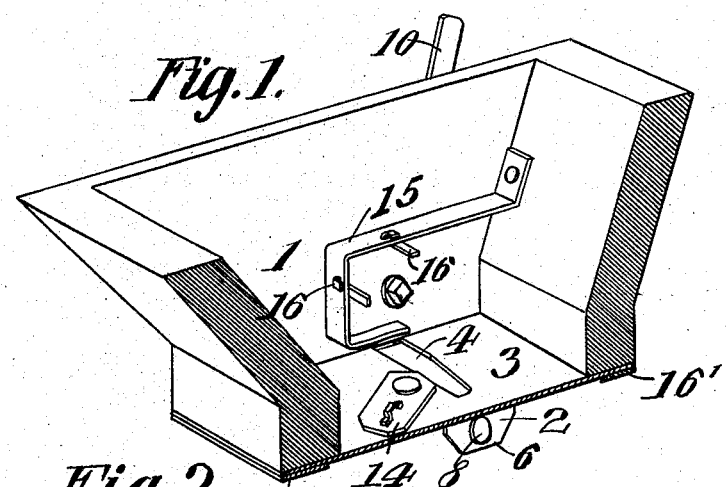
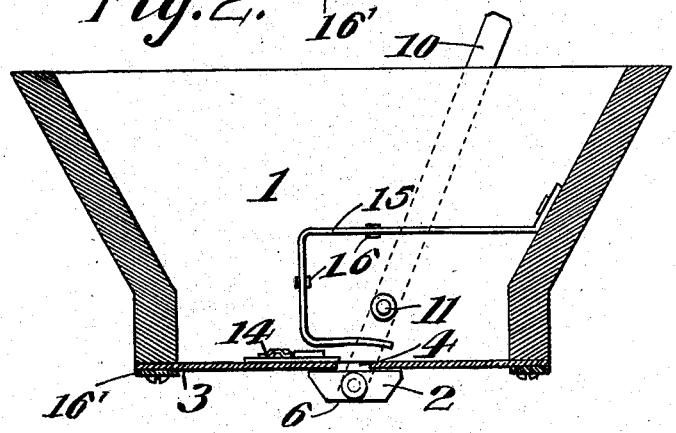
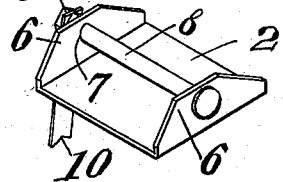
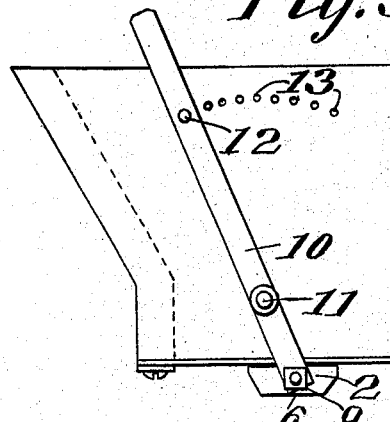
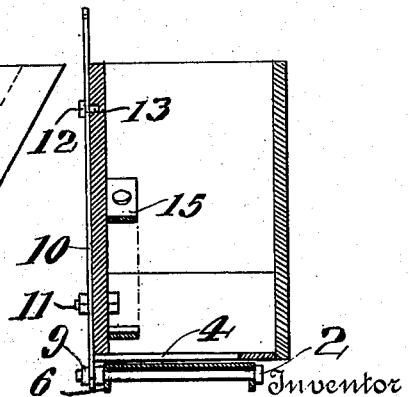
Witnesses
Inventor
Gilbert E. Alphin,
By Attorneys

UNITED STATES PATENT OFFICE.

GILBERT E. ALPHIN, OF MOUNT OLIVE, NORTH CAROLINA.

FERTILIZER-DISTRIBUTER.

No. 899,646.    Specification of Letters Patent.    Patented Sept. 29, 1908.

Application filed June 8, 1908. Serial No. 437,404.

*To all whom it may concern:*

Be it known that I, GILBERT E. ALPHIN, a citizen of the United States, residing at Mount Olive, in the county of Wayne and State of North Carolina, have invented certain new and useful Improvements in Fertilizer-Distributers; and I do declare the following to be a full, clear, and exact description of the invention, such as will enable others skilled in the art to which it appertains to make and use the same.

My invention relates to improvements in fertilizer distributers.

It has for its object to regulate or control the amount of fertilizer for dropping or distribution, also to predetermine the quantity of the fertilizer for that purpose, and to carry out the aforesaid objects in a simple and expeditious manner.

With these and other objects in view, the invention consists of certain novel features of construction, combination and arrangement of parts, as will be more fully described and particularly pointed out in the appended claims.

In the accompanying drawings, illustrating the preferred embodiment of my invention, Figure 1 is a broken perspective view of the parts of a fertilizer distributer showing the application of said invention thereto; Fig. 2 is a vertical longitudinal section of the same; Fig. 3 is a side view thereof; Fig. 4 is a detached perspective view of the fertilizer dropping slide or valve; Fig. 5 is a cross section through the hopper produced centrally through the longitudinal plane of the fertilizer dropping opening and through the pivoted plate or regulator for said opening and through the valve or slide for said opening.

In carrying out my invention I employ in connection with the usual hopper 1 holding the fertilizer for distribution, a valve or slide 2 arranged upon the lower side of the preferably metallic bottom 3 of said hopper for regulating the dropping or distribution of the fertilizer through an elongated transverse opening 4 in said bottom. Said slide or valve consists preferably of a plate having its upper surface toward the under side of the bottom of the hopper to effect the closing of the fertilizer dropping opening in said bottom. Said valve plate has pendent end portions 6 and through apertures 7 in said end portions or flanges is passed a pivot bolt 8 with one end headed or otherwise suitably formed outside of one of said flanges for the retention thereof in place, the opposite end of said pivot-bolt having jam-nut connection 9 with a manually actuated lever 10 pivoted as at 11 to one side of the fertilizer hopper. Said valve-plate is arranged upon its pivot bolt so as to have freedom of movement thereon to enable it to rock more or less as said lever is actuated to avoid said plate binding upon the hopper bottom and yet to move in close relation to the same, as in moving said lever for effecting the adjustment of said plate or valve with relation to the fertilizer dropping opening. It will be noted that said valve plate, as it is thus adjusted, provides for opening or closing the fertilizer outlet in the hopper bottom or for varying the dropping capacity of said outlet according to the amount of fertilizer it may be desired to distribute. This valve 2 is preferably supported at one end only by the lever 10 as shown.

The lever 10 is provided with a lateral detent or projection 12 adapted for engagement with any one of a series of notches or orifices 13 in the opposite side of the hopper for the retention of said lever, with the fertilizer dropping valve, in the desired adjusted position.

To the upper surface of the hopper bottom is pivoted a plate or regulator 14 with relation to the fertilizer dropping opening and by the suitable manipulation of which regulator the size of said opening may be relatively varied for predetermining the amount of fertilizer to be received by said opening.

An angular member or bar 15 is suitably secured to the inner surface of the fertilizer hopper and is equipped with projections or studs 16 adapted, in practice, to be engaged by fingers (not shown) on the usual transporting wheel shaft for vibrating said angular member, in effecting the agitation or loosening of the contents of the fertilizer hopper as will be readily understood. It will be noted that the bottom of the fertilizer hopper, although adapted to be secured in place in any preferred manner, it may be thus secured by means of cross plates 16' each having a screw or bolt passed centrally through and entering end pieces of the hopper.

From the foregoing description, taken in connection with the accompanying drawings, the construction and operation of the invention will be readily understood without requiring a more extended explanation.

Various changes in the form proportion and the minor details of construction may be resorted to without departing from the principle or sacrificing any of the advantages of the invention, as defined in the appended claims.

Having thus described my invention, what I claim as new is:—

1. A fertilizer distributer provided with a valve arranged for controlling the dropping of the fertilizer, said valve having a pivot bolt extending through depending portions of said valve, said valve being adapted to rock on said pivot bolt during the operation of the valve.

2. A fertilizer distributer having its hopper provided with a fertilizer dropping opening, and a valve for controlling the dropping of the fertilizer from said opening comprising a plate, a pivot bolt, and a lever attached to said pivot bolt, said plate or valve preferably being loosely arranged upon said pivot bolt.

3. A fertilizer distributer having a valve for controlling the dropping of the fertilizer from its hopper, comprising a plate, a pivot bolt, and a lever connected to said pivot bolt, said plate being loosely mounted upon said pivot bolt.

4. A fertilizer distributer having a dropping opening a valve for controlling the dropping of its contents, comprising a plate arranged opposite said dropping opening, a pivot bolt, and a lever having connection with one end of said pivot bolt, said plate being loosely mounted upon said pivot bolt.

5. A fertilizer distributer having its hopper provided with an opening through its bottom, and a regulator pivoted to the upper surface of the bottom of said hopper and adapted to vary the relative size of said opening and adjustable means operable on the lower face of said bottom for regulating the dropping of said fertilizer through said opening.

In testimony whereof I have hereunto set my hand in presence of two subscribing witnesses.

GILBERT E. ALPHIN.

Witnesses:
M. R. JENNETT,
S. B. TAYLOR.